UNITED STATES PATENT OFFICE.

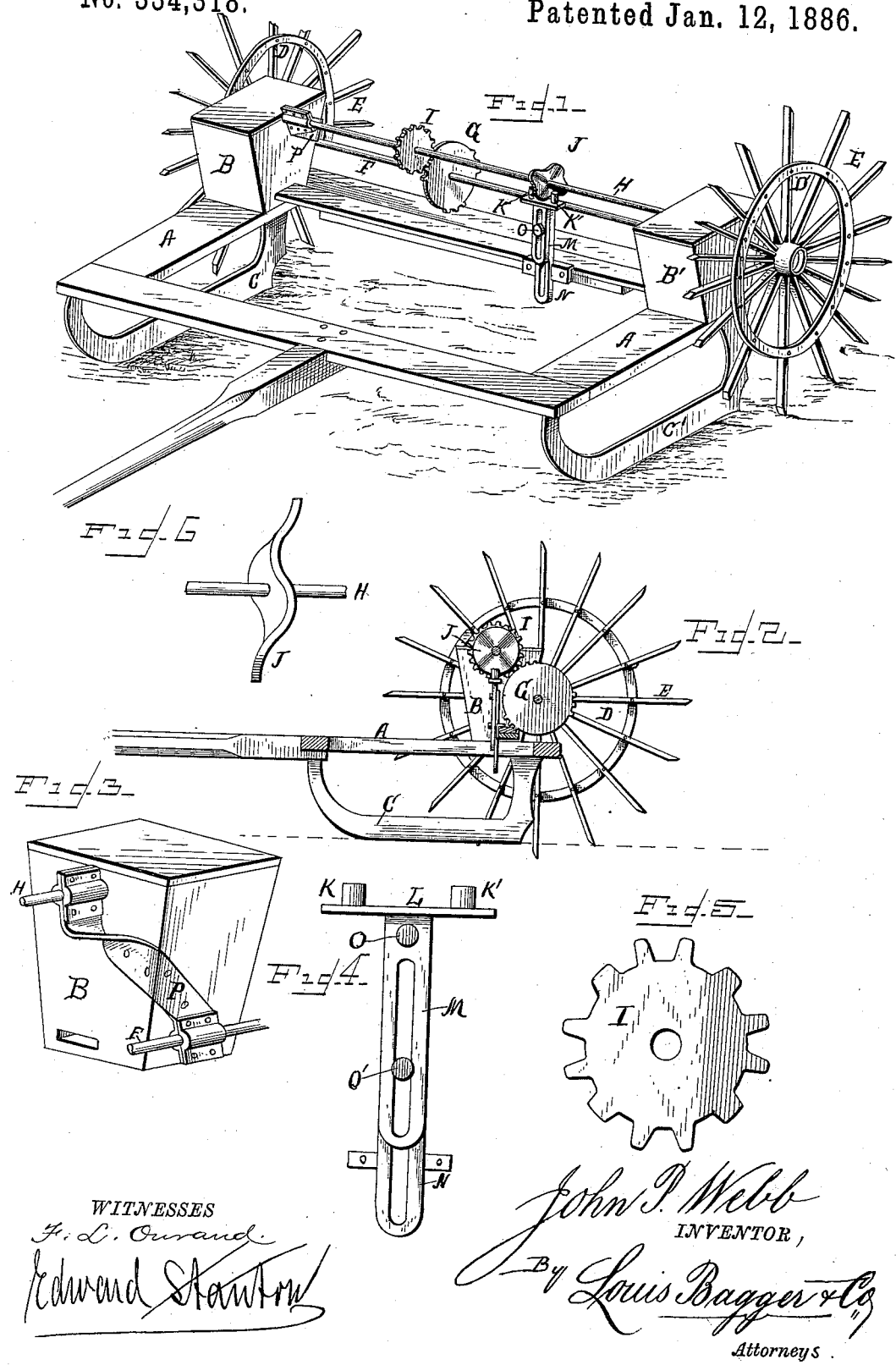

JOHN P. WEBB, OF WAKENDA, MISSOURI.

CORN-PLANTER.

SPECIFICATION forming part of Letters Patent No. 334,318, dated January 12, 1886.

Application filed July 25, 1885. Serial No. 172,687. (No model.)

*To all whom it may concern:*

Be it known that I, JOHN P. WEBB, a citizen of the United States, residing at Wakenda, in the county of Carroll and State of Missouri, have invented a new and useful Automatic Corn-Planter, of which the following is a specification.

My invention relates to improvements in corn-planters, in which, by a combination of wheels and cogs acting automatically, corn may be dropped regularly and rapidly without the intervention of either wire or rope, or the usual hand-motion of the ordinary corn-planter. I attain this object by the mechanism illustrated in the accompanying drawings, in which—

Figure 1 is a perspective view of my improved dropper with the seat removed. Fig. 2 is a sectional view of the same. Fig. 3 is a perspective view of one of the seed-boxes, showing the method of securing the axle and shaft to the same. Fig. 4 is a plan view of part of the operating mechanism. Fig. 5 is a detail view of one of the operating-wheels, and Fig. 6 is a detail view of another one of the operating-wheels.

The same letters refer to similar parts in all the figures.

In the drawings, A represents the frame of a corn-planter, upon which are placed two seed-boxes, B and B'. To the under side of the frame below the seed-boxes are two furrowing sleds or runners, C and C', which receive the seed from the boxes and deposit it in the ground.

The frame, seed-boxes, and runners may be of any desired construction; or my improvement can be applied to any of the planters now in use.

Secured in bearings at the rear of the seed-boxes is a shaft, F, to the ends of which are secured two driving-wheels, D and D'. These wheels have spokes E, which extend through the rims; or the rims can be provided with projections, which enter the ground a slight distance and cause them to revolve as the machine advances, and thus cause the shaft F to be rotated with a positive motion. Near the center of this shaft is a wheel, G, provided with sets or groups of cogs arranged at equal distances apart around the periphery of the wheel.

Secured to the tops of the seed-boxes by means of suitable bearings in the ends of the plates P, which are secured to the seed-boxes, as shown, is a shaft, H, having the pinion I, and which engages with and is operated by the wheel G. The cogs of the pinion I are also arranged in groups or sets, the number of teeth in each set corresponding with the number of teeth in the sets or groups of the wheel G. Between each set of cogs on the pinion I is a cog that is wider and shorter than the teeth in the sets, and which bears against the periphery of the wheel G, until the first tooth or cog of a set strikes against it and turns it forward out of the way, and causes the following teeth to engage without danger of their catching upon one another and breaking. If desired, the points of these wider cogs can be slightly hollowed out, so as to ride upon the periphery of the wheel G without any danger of being turned either way too far, thus insuring positive motion.

Secured upon the shaft H is an eccentric or zigzag cam-wheel, J, the periphery of which revolves between two small rollers, K and K', journaled upon the cross-piece L, just far enough apart to permit the rim of the wheel J to pass between them without binding. This cross-piece L is rigidly secured upon the top of the slotted lever M, which is adjustably secured upon the slotted standard N by means of the set-screws O and O'. The standard N is rigidly secured to the dropper-bar, the opposite ends of which enter the bottoms of the seed-boxes, and are provided with suitable dropping mechanism.

In the drawings, the wheel G is provided with three sets or groups of three teeth each; but it is evident that the number of sets can be changed by changing the diameter of the wheel and the diameter of the driving-wheels, or both of them at the same time, as may be desired, it only being necessary to cause one of the sets of cogs to engage with the pinion every time that the machine has advanced the requisite distance for each hill of corn. The sets of cogs, however, on the pinion I should be four in number, so as to cause the shaft H to make one quarter of a revolution every time that a set of cogs on the wheel G passes, and thus cause one of the curves or zigzags of the wheel J to pass between the rollers K and K', which in turn moves the lever, standard, and dropper-bar to one side and drops a hill of corn. At the passage of the next set of cogs on the wheel G the shaft H is given another quarter of a revolution, and another curve or zigzag passes the rollers K and K', and the lever, standard, and dropper-bar are carried in the opposite direction and another hill of corn is planted. It will also be noticed that the sets or groups of teeth upon the wheel G and pinion I are composed of three teeth; but, if desired, the number can be altered, as it is only necessary to have them correspond with each other, so that each set of teeth of the wheel G will rotate the pinion I one-quarter of a revolution every time a set passes. After a set of cogs on the wheel G passes the pinion I it remains stationary until the next set of cogs comes in contact with it, when it is again quickly rotated and again stops. This process secures a quick and positive motion of the dropper-bar without any danger of scattering the seed along the row, as would be apt to be the result if the bar moved slowly.

By means of the projections on the rims of the drive-wheels the dropper-bar is always caused to be operated at the desired distances across the field, and all that is necessary to insure the hills being planted in squares or in rows in both directions is to set the dropper attachment correctly at each end of the field before starting each new row, and which can be done by having a furrow along each side of the field or by stakes arranged so that the machine can always be set at the same place before starting.

By means of the slotted lever and standard the rollers K and K' can be properly adjusted in relation to the cam-wheel J, or they can be lowered so far as to be entirely out of engagement, as when it is desired to move the machine from one place to another without operating the dropping mechanism.

Having thus described my invention, I claim and desire to secure by Letters Patent of the United States—

1. The combination, with a corn-planter provided with suitable driving-wheels and shaft, of a wheel secured upon said shaft having sets of cogs upon its periphery at equal distances apart, a shaft secured to the dropper and provided with two wheels, one of which is provided with cogs and engages with the wheel upon the driving-shaft and the other wheel is an eccentric or zigzag cam-wheel, and a lever, one end of which engages with said eccentric and the other with the dropper-bar, as described.

2. The combination, with a corn-planter provided with a wheel secured upon a revolving shaft having sets or groups of cogs at equal distances apart on its periphery, of a shaft secured in bearings at the tops of the seed-boxes having two wheels secured thereon, one of said wheels having four sets or groups of cogs on its periphery and a wider and shorter cog between each set of cogs, the other of said wheels being an eccentric or zigzag cam-wheel, and a lever, one end of which engages with said eccentric and the other with the dropper-bar, as described.

3. The combination, with a corn-planter provided with the above-described cog-wheels having sets or groups of cogs upon their peripheries and eccentric or zigzag cam-wheel, of a slotted lever having a cross-piece at its top, two wheels journaled thereon, a slotted standard rigidly secured to the dropper-bar, one end of said lever engaging with said cam-wheels by means of said two wheels, and being secured at the other end to said slotted standard by means of set-screws, as described.

JOHN P. WEBB.

Witnesses:
 JAS. M. BUSBY,
 DAVID MONTGOMERY.